United States Patent
Zhou et al.

(10) Patent No.: US 8,563,100 B1
(45) Date of Patent: Oct. 22, 2013

(54) WALL COVERING

(71) Applicant: Hewlett-Packard Development Company, L.P., Houston, TX (US)

(72) Inventors: Xiaoqi Zhou, San Diego, CA (US); Xulong Fu, San Diego, CA (US); Paul C. Landrum, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/830,198

(22) Filed: Mar. 14, 2013

(51) Int. Cl.
  *B41M 5/00* (2006.01)
  *B41M 5/52* (2006.01)
  *B41M 5/50* (2006.01)
  *D06N 7/00* (2006.01)
  *D21H 27/20* (2006.01)
  *D06P 5/30* (2006.01)

(52) U.S. Cl.
  CPC ............. B41M 5/5218 (2013.01); B41M 5/508 (2013.01); B41M 5/52 (2013.01); B41M 5/5254 (2013.01); D06N 7/0002 (2013.01); D21H 27/20 (2013.01); D06P 5/30 (2013.01); Y10S 428/9044 (2013.01)
  USPC .................... 428/32.16; 428/32.2; 428/32.34; 428/904.4

(58) Field of Classification Search
  CPC ...... B41M 5/5218; B41M 5/508; B41M 5/52; B41M 5/5254; D06N 7/0002; D06P 5/30; D21H 27/20
  USPC ......................... 428/32.16, 32.2, 32.34, 904.4
  See application file for complete search history.

(56) References Cited

U.S. PATENT DOCUMENTS

| | | | |
|---|---|---|---|
| 4,296,162 A | 10/1981 | Jean | |
| 4,460,643 A | 7/1984 | Stevens et al. | |
| 4,489,188 A | 12/1984 | Jones et al. | |
| 4,844,972 A | 7/1989 | Tedeschi et al. | |
| 5,236,987 A | 8/1993 | Arendt | |
| 6,440,269 B1 | 8/2002 | Freeburn | |
| 6,764,804 B2 | 7/2004 | Bourdelais et al. | |
| 7,129,190 B2 * | 10/2006 | Takahashi et al. | 442/181 |
| 7,696,262 B2 | 4/2010 | Cagle et al. | |
| 2004/0029030 A1 * | 2/2004 | Murray | 430/130 |
| 2006/0292317 A1 * | 12/2006 | Parrinello et al. | 428/32.22 |
| 2007/0012413 A1 | 1/2007 | Braun et al. | |
| 2007/0218796 A1 | 9/2007 | Yao | |
| 2007/0275617 A1 * | 11/2007 | Harris et al. | 442/59 |
| 2007/0287345 A1 | 12/2007 | Confalone et al. | |
| 2009/0075070 A1 | 3/2009 | Kitchin et al. | |
| 2010/0221973 A1 | 9/2010 | Ketzer et al. | |

FOREIGN PATENT DOCUMENTS

| | | |
|---|---|---|
| EP | 2050784 A1 | 4/2009 |
| WO | 2012072257 A1 | 6/2012 |

OTHER PUBLICATIONS

Terralon(TM) Brochure/Specification, An Earth Intelligent Wallcovering, DreamScape—a division of Roysons Corp., Rockaway, NJ 07866 (2 pages).

* cited by examiner

*Primary Examiner* — Betelhem Shewareged (57) ABSTRACT

A wall covering includes a composite structure that includes a first layer forming a non-image side of the composite structure and a second layer laminated to the first layer forming an image side of the composite structure. The first layer includes a fabric to facilitate air flow on the non-image side. The image side has a surface roughness of less than or equal to 5 microns by PPS method. The second layer includes one of synthetic polymeric fiber in a non-woven structure and a synthetic polymeric film. The wall covering is a Type-II wall covering that is PVC-free.

15 Claims, 2 Drawing Sheets

WALL COVERING

CROSS-REFERENCE TO RELATED APPLICATIONS

N/A

STATEMENT REGARDING FEDERALLY SPONSORED RESEARCH OR DEVELOPMENT

N/A

BACKGROUND

Large format print media finds use in applications such as wall coverings, banners, and signs of many types that can be printed using a variety of printing techniques to create images with one or more of symbols, text and photographs. Durability of the large format print media and the printed image thereon is a consideration for wall coverings. In particular, mechanical resistance to rubbing and to other mechanical wear and tear is a consideration.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein are directed to a composite structure to support digital print media and in particular, to a wall covering that employs the composite structure. The wall covering has a durability that may meet or exceed Type-II, commercial serviceability wall covering standards or specifications, to provide a durable Type-II wall covering that is also free of polyvinyl chloride (PVC), which is harmful to the environment. The PVC-free wall covering according to the principles described herein overcomes the environmental problems inherent with vinyl wall coverings, but does so without sacrificing durability, image quality or usability, for example.

The composite structure includes laminated layers that form a non-image side and an image side of the composite structure. The non-image or backside of the composite structure is the side that would face and attach to a wall in a wall covering application, or even in a sign or banner application having a single image side. The image side of the composite structure is the side that includes material layers to receive, support and protect an image. A first layer of the composite structure includes a fabric. The fabric has a fabric structure to facilitate airflow on the non-image side, or back side, of the composite structure. A second layer of the composite structure is laminated to the first layer to form the image side of the composite structure. The second layer includes a synthetic polymeric component and is configured with a surface roughness of less than about 5 microns by PPS method. The composite structure provides a mechanical breaking strength (tensile strength) to the wall covering that exceeds 50 pounds (lb) of force in both the machine direction (MD) and the cross-machine direction (CMD), as specified in Type II, or higher grade, wall covering specifications.

In some examples, the synthetic polymeric component of the second layer is a synthetic polymeric film with a high molecular weight polymer. In other examples, the synthetic polymeric component of the second layer is synthetic polymeric fiber in a fiber composition of a non-woven structure. The fiber composition of the second layer further includes natural fibers.

A wall covering that includes the composite structure further includes an image receiving layer coated on the second layer (i.e., on image side of the composite structure). The image receiving layer is configured to receive an imaging material, for example, an ink that is printed in the form of an image. In addition, the wall covering further includes an anti-mechanical wear layer coated on the image receiving layer. The anti-mechanical wear layer is configured to protect the wall covering surface and any image printed thereon from mechanical damage like rubbing and wearing. The anti-mechanical wear layer on the wall covering facilitates a resistance to mechanical wear of 300 cycles or more of abrasion, as specified in Type II, or higher grade, wall covering specifications. In particular, the anti-mechanical wear layer has a first structure before image printing that is porous and configured to receive an ink colorant and allow other ink components of the imaging material to penetrate through the anti-mechanical wear layer and into the image receiving layer of the wall covering during printing. The anti-mechanical wear layer transforms into a second structure after the ink colorant is printed onto an outermost surface of the wall covering and the other ink components have penetrated into the image receiving layer to form the image. The second structure of the anti-mechanical wear layer is a non-porous, transparent thin film structure on the outermost surface of the wall covering to further protect the image. Wall coverings that includes the composite structure and the anti-mechanical wear layer according to the principles described herein may have improved durability.

As used herein, the article 'a' is intended to have its ordinary meaning in the patent arts, namely 'one or more'. For example, 'a layer' generally means one or more layers and as such, 'the layer' means 'the layer(s)' herein. The phrase 'at least' as used herein means that the number may be equal to or greater than the number recited. The phrase 'no greater than' as used herein means that the number may be equal to or less than the number recited. The term 'about' as used herein means that the value recited is within the normal tolerances of the equipment used to measure the value; or in some examples, the value may differ by plus or minus 20%, or plus or minus 15%, or plus or minus 10%, or plus or minus 5%, or plus or minus 1%, for example. Any ranges of values provided herein include values within or between the provided ranges. The term 'substantially' as used herein means a majority, or almost all, or all, or an amount with a range of about 51% to about 100%, for example.

Also, any reference herein to 'top', 'bottom', 'upper', 'lower', 'up', 'down', 'back', 'front', 'left' or 'right' is not intended to be a limitation herein. The designations 'first' and 'second' if used herein is for the purpose of distinguishing between items and are not intended to imply any sequence, order, or importance to one item over another item or any order of operation, unless otherwise indicated. Moreover, examples herein are intended to be illustrative only and are presented for discussion purposes and not by way of limitation.

The term 'wall covering,' as used herein, means a large format print media that has a length that is much larger than a width (or vice versa) relative to small format office paper or photo media products (e.g., letter, A4, legal, etc. sizes). For example, the wall covering may be provided in a roll that is 1.37 meters (54 inches) wide and 27.43 meters (30 linear yards) long. Moreover, the term 'wall covering' means a print media that supports various imaging materials and applications, for example, various types of inkjet inks and inkjet printing, for image formation, including digital printing. In addition, the term 'wall covering' means a product that complies with federal and industry standards or specifications for wall coverings including, but may not be limited to, CCC-W-408A and D, ASTM F793 and CFFAW-101D. Under these standards, wall coverings have weight and durability requirements depending on which category or type that the wall covering falls within. Category I is for decorative only wall covering, while Category VI is for commercial serviceability wall covering. Types I, II and III wall coverings are substantially equivalent to Categories, IV, V and VI, respectively, among the standards. The wall covering according to the principles described herein has wear and tear durability of Type-II, or possibly higher grade, wall coverings in accordance with the aforementioned standards and may meet or exceed established criteria for Type-II wall coverings under the aforementioned standards. Herein, the term 'wall covering,' 'wall covering print media,' and 'wall covering digital print media' may be used interchangeably. By 'wear and tear' it is meant the minimum scrubbability standard and the minimum breaking strength standard, respectively, of ASTM F793, as further described below.

The term 'composite,' as used herein, means a material made from at least two constituent layers that have one or both of different physical properties and different chemical properties from one another, wherein these constituent layers remain separate at a molecular level and distinct within the structure of the composite. The composite is a laminated structure. In some examples, the composite further includes an adhesive constituent layer laminated between two other constituent layers. A 'composite structure,' as used herein, is a support or substrate for print media in that the composite structure supports wall covering material layers including, but not limited to, one or more of imaging receiving, imaging, protective materials layers, as well as adhesive materials coated as separate layers onto the composite structure. Moreover, the composite structure supports the wall covering when applied or attached to a surface or wall in a variety of applications and environments, for example, high moisture and high abrasion environments.

The term 'fabric' as used herein is intended to mean a textile, a cloth, a fabric material, fabric clothing, or another fabric product that has mechanical strength and air permeability. The term 'fabric structure' is intended to mean a structure having warp and weft that is one of woven, non-woven, knitted, tufted, crocheted, knotted, and pressed, for example. The terms 'warp' and 'weft' refers to weaving terms that have their ordinary means in the textile arts, as used herein, e.g., warp refers to lengthwise or longitudinal yarns on a loom, while weft refers to crosswise or transverse yarns on a loom.

According to some examples of the principles described herein, a composite structure to support a wall covering is provided. The composite structure has an image side and a non-image side. The composite structure comprises a first layer and a second layer laminated together. The first layer forms, or is adjacent to, the non-image side of the composite structure. The non-image side is a side of the composite structure that is intended to face a wall or wall surface for attachment, and may be referred to as the back side of the composite structure. The second layer forms, or is adjacent to, the image side of the composite structure. The image side of the composite structure is to support material layers coated on a surface of the second layer to facilitate an image to be formed on the image side. As such, the second layer is a smooth material that further may be flat to receive the coating layers. The composite structure may be porous or non-porous, and may be substantially flexible. By 'flexible' it is meant pliant or pliable and able to be rolled and unrolled without breaking or cracking, for example.

By 'smooth' it is meant that the surface roughness of the second layer is no greater than about 5 microns by PPS method (i.e., Parker Print Surf method). In some examples, the surface roughness by PPS method of the second layer is no greater than 4 microns, or no greater than 3 microns, or no greater than 2 microns, or no greater than 1 micron, or no greater than about 0.5 microns. The composite structure is durable, flexible support. By 'durable' it is meant that the composite structure has a high tolerance to certain physical forces and surface degradation forces. The durability of the composite structure is manifested according to one or more of tear and tensile strength, surface abrasion, water and solvent resistance, fire resistance, dimensional stability, stain resistance, heat ageing, cold climate, and others described in the wall covering classification standards ASTM F793 and Federal Specification CCC-W-408D, for example, for Type II commercial serviceability wall coverings. The composite structure according to the principles herein meets or may exceed these specifications or standards when incorporated in wall coverings.

The first layer of the composite structure includes a fabric having warp and weft to facilitate airflow on the non-image side. Airflow refers to one or both of through a thickness of the fabric (e.g., z direction) and along an interface between the fabric and a surface, such as a wall, to which the non-image side of the fabric is to be attached (e.g., x and y directions). Adequate airflow helps to prevent formation of some detrimental biological growth, such as mold and mildew formation. Adequate airflow may be validated by two separate methods. A first method uses fluid-flow measurements per ASTM E96, which determines the relative water-vapor transmission rate through a medium. A second method is per ASTM D6329 in combination with UL GreenGuard Test Method PO40, which determines an ability of the medium to grow and sustain mold and mildew formations.

The fabric has a fabric structure that includes, but is not limited to, one of woven, non-woven, knitted and tufted; and has a fabric surface that may be one of flat or exhibits pile. Moreover, the fabric structure may have a surface roughness or texture to form airflow channels or pathways at the interface with the wall surface to which the fabric is to be attached to facilitate airflow. The fabric may have one or both mechanical strength properties and air permeability properties. In some examples, the fabric of the first layer is a woven textile including, but not limited to, satin, poplin, and crepe weave. In some examples, the fabric of the first layer is a knitted textile including, but not limited to, circular knit, warp knit, and warp knit with a micro denier face.

In some examples, the fabric is a woven fabric where warp yarns and weft yarns are mutually positioned at an angle of about 90°. This woven fabric includes, but is not limited to, fabric with a plain weave structure, fabric with twill weave structure where the twill weave produces diagonal lines on a face of the fabric, or a satin weave. For example, the direction of the diagonal lines of the twill weave, as viewed along a warp direction, may be up to the right or to the left making a Z or S twill. Compared to plain weave (of the same cloth parameters) twills have longer floats, fewer intersections and a more open construction to help air flow. In contrast to twill weave, the satin weave has a smooth fabric surface free from twill lines by making the distribution of interlacing points between the weft yarns and the warp yarns as random as possible to avoid twill lines. For example, by 'interlacing points' it is meant a number of weft yarns float over a single warp yarn, or vice versa, i.e., a number of warp yarns float over a single weft yarn. In some examples of satin weave, the interlacing points repeat by 5, or by 6, or by 7, or by 8.

In some examples, the fabric is a knitted fabric with a loop structure including one or both of warp-knit fabric and weft-knit fabric. The weft-knit fabric refers to loops of one row of fabric are formed from the same yarn. The warp-knit fabric refers to every loop in the fabric structure is formed from a separate yarn mainly introduced in a longitudinal fabric direction. In some examples, the fabric of the first layer is a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric of the first layer comprises one or both of natural fibers and synthetic fibers. Natural fibers that may be used in the fabric of the first layer include, but are not limited to, wool, cotton, silk, linen, jute, flax, or hemp. Additional fibers that may be used include, but are not limited to, rayon fibers, or those of thermoplastic aliphatic polymeric fibers derived from renewable resources, including, but not limited to, corn starch, tapioca products, or sugarcanes. These additional fibers are also referred to herein as 'natural' fibers for simplicity of discussion. In some examples, the fiber used in the fabric of the first layer includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric of the first layer is polymeric fiber including, but not limited to, polyvinyl chloride (PVC)-free fibers made of polyester, polyamide, polyimide, polyacrylic, polypropylene, polyethylene, polyurethane, polystyrene, polyaramid, e.g., KEVLAR®, polytetrafluoroethylene, e.g., TEFLON® (both trademarks of E. I. du Pont de Nemours and Company), fiberglass, polytrimethylene, polycarbonate, polyester terephthalate, or polybutylene terephthalate. In some examples, the fiber used in the fabric of the first layer includes a combination of two or more of the polymeric fibers, a combination of any of the polymeric fibers with another polymer fiber or with natural fiber, a mixture of two or more of the polymeric fibers, or a mixture of any of the polymeric fibers with another polymer fiber or with natural fiber. In some examples, the synthetic fiber includes modified polymeric fibers. The term 'modified fibers' refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term 'PVC-free' means no polyvinyl chloride (PVC) polymer or vinyl chloride monomer units present in the wall covering or the composite structure.

In some examples, the fabric comprises both natural fiber and synthetic polymeric fiber, wherein an amount of synthetic fibers is about 90% of total fiber count and an amount of natural fibers is about 10% of total fiber count. The percentage of total fiber count of the synthetic fibers and natural fibers in the fabric of these examples may be from about 80% synthetic fiber and about 20% natural fiber, or about 70% synthetic fiber and about 30% natural fiber, or about 60% synthetic fiber and about 40% natural fiber, or about 50% synthetic fiber and about 50% natural fiber, or about 40% synthetic fiber and about 60% natural fiber, or about 30% synthetic fiber and about 70% natural fiber, or about 20% synthetic fiber and about 80% natural fiber, or about 10% synthetic fiber and about 90% natural fiber. In some examples, the first layer fabric further comprises additives including, but not limited to, one or more of colorant (e.g., pigments, dyes, tints), antistatic agents, brightening agents, nucleating agents, antioxidants, UV stabilizers, fillers, flame retardants, and lubricants, for example. The additives are included to improve various properties of the fabric.

The second layer of the composite structure comprises a PVC-free synthetic polymeric component that is one of synthetic polymeric fiber in a non-woven structure and a synthetic polymeric film. In some examples, the PVC-free synthetic polymeric component is the synthetic polymeric fiber in a fiber composition that further includes natural fiber. The synthetic polymeric fiber includes, but is not limited to, those fibers made from polyolefins, polyamides, polyesters, polyurethanes, polycarbonates, polyacrylics, a combination of two or more of the fibers, or a mixture of two or more of the fibers. The synthetic polyolefin fiber may include, but is not limited to, polyethylene fiber, polyethylene copolymer fiber, polypropylene fiber, polypropylene copolymer fiber, a combination of two or more of the polyolefin fibers, a combination of any of the polyolefin fibers with another polymeric fiber, mixtures of two or more of the polyolefin fibers, or mixtures of any of the polyolefin fibers with another polymer fiber. In some examples, the fiber composition may include a synthetic cellulosic material including, but not limited to, cellulose diacetate, cellulose triacetate, cellulose propionate, cellulose butyrate, cellulose acetate butyrate and nitrocellulose.

The fiber composition is used to form a web of the second layer having the non-woven structure, for example, using paper making equipment. The synthetic polymeric fiber of the second layer may have an average length within a range of about 1 millimeter (mm) to about 3 mm. This length is comparable to the length of natural cellulose fibers. In some examples, the synthetic polymeric fiber has a length greater than 3 mm, provided that the synthetic polymeric fiber does not negatively impact the formation of the second layer using the paper making equipment, for example on a screen of a paper mill. In some examples, the synthetic polymeric fiber has diameter within a range of about 10 micrometers or microns (μm) to about 40 μm with an average length within a range of about 2 mm and about 3 mm. The amount of the synthetic polymeric fiber in the second layer depends on the length of the fiber. For example, the use of longer synthetic fibers may allow for improvement in dimensional stability of the composite structure with lower amounts of the synthetic polymeric fibers being used.

As indicated above, the fiber composition of the second layer of the composite structure comprises both the synthetic polymeric fiber and natural fiber. The natural fiber includes natural cellulose fiber from either hardwood species or hardwood species and softwood species. In some examples, a ratio of hardwood fiber to softwood fiber in the second layer is within a range of about 100:0 to about 50:50. The natural cellulose fiber may be processed into various pulps including, but not limited to, wood-free pulp, such as bleached or unbleached kraft chemical pulp and bleached or unbleached sulfite chemical pulp; wood-containing pulp, such as one or more of groundwood pulp, thermomechanical pulp, and chemo-thermomechanical pulp; pulp of non-wood natural fiber, such as one or more of bamboo fiber, bagasse fiber, recycled fiber, cotton fiber; a combination of two or more pulps, or a mixture of two or more of pulps.

An amount of synthetic polymeric fiber in the second layer fiber composition that further includes natural fiber may be within a range of about 10% to about 80% by weight of total fiber. In some examples, the amount of synthetic polymeric fiber by weight of total fiber in the second layer fiber composition is about 10% to about 70%, or about 10% to about 60%, or about 10% to about 50%, or about 10% to about 40%, or about 10% to about 30%, or about 10% to about 20%. In some examples, the amount of synthetic polymeric fiber by weight of total fiber in the second layer fiber composition is about 10% to about 80%, or about 10% to about 80%, or about 15% to about 80%, or about 20% to about 80%, or about 25% to about 40%.

The second layer fiber composition of the composite structure may further comprise a polymeric binder. The polymeric binder may be pre-mixed with one or both of the synthetic polymeric fiber and the natural fiber, for example. Examples of polymeric binder included in the second layer composition include, but are not limited to, water soluble polymers, such as polyvinyl alcohol, starch derivatives, gelatin, cellulose derivatives, acrylamide polymers; water-dispersible polymers, such as acrylic polymers or copolymers, vinyl acetate latex, polyesters, and styrene-butadiene or acrylonitrile-butadiene copolymer latex; a combination of two or more of the above polymeric binders; or a mixture of two or more of the above polymeric binders. The polymeric binder may have a glass transition temperature (Tg) within a range of about −30° C. to about 10° C. In some examples, the Tg of the polymeric binder is within a range of −25° C. to about 10° C., or −20° C. to about 10° C., or −15° C. to about 10° C., or −10° C. to about 10° C. A ratio of latex resin binder to the natural cellulose fiber in the second layer composition may range from about 1:20 to about 1:1. In some examples, the ratio of latex resin binder to the natural cellulose fiber in the second layer composition ranges from about 1:15 to about 1:1, or about 1:10 to about 1:1, or about 1:5 to about 1:1. Moreover, aqueous coupling agents also may be used in the fiber composition in an amount to improve binding between the fibers. Representative examples of commercially available coupling agents include, but are not limited to, Dow Corning® Z 6032, Dow Corning® Z 6030, and Dow Corning® Z 6040 silanes from Dow Corning, Inc., MI, USA, or Struktol® SCA 98, Struktol® SCA 930, and Struktol® SCA 960 organosilanes from Struktol Company of America, OH, USA.

In other examples, the PVC-free synthetic polymeric component of the second layer of the composite structure is a synthetic polymeric film of high molecular weight. By 'high molecular weight', it is meant a weight average molecular weight ($M_w$) that is greater than $1 \times 10^4$ grams per mole (g/mol). The synthetic polymeric film may be made from a non-vinyl chloride polymer including, but not limited to, one or both of homopolymers and copolymers of polyethylene (PE), polypropylene (PP), nylon (polyamides), polystyrene, acrylonitrile butadiene styrene (ABS), polycarbonate, a combination of two or more thereof, or a mixture of two or more thereof. By 'non-vinyl chloride polymer' it is meant that there is no polyvinyl chloride (PVC) existing in the synthetic polymeric film, or that the synthetic polymeric film contains no vinyl chloride chain units (i.e., a PVC-free film), since polyvinyl chloride is known to be harmful to the environment, as mentioned above.

The synthetic polymeric film of the second layer of the composite structure may have a thickness within a range of about 40 microns to about 300 microns. In some examples, the thickness of the synthetic polymeric film of the second layer is within the range of about 60 microns to about 300 microns, or about 80 microns to about 300 microns, or about 100 microns to about 300 microns, or about 125 microns to about 300 microns, or about 150 microns to about 300 microns, or about 200 microns to about 300 microns. In some examples, the thickness of the synthetic polymeric film of the second layer of the composite structure is within the range of about 40 microns to about 250 microns, or about 40 microns to about 200 microns, or about 40 microns to about 175 microns, or about 40 microns to about 150 microns, or about 40 microns to about 125 microns, or about 40 microns to about 100 microns.

Moreover, the synthetic polymeric film of the second layer of the composite structure may have a density in a range of about 0.50 grams per cubic centimeter ($g/cm^3$) to about 1.2 $g/cm^3$. In some examples, the density of the synthetic polymeric film of the second layer is within the range of about 0.55 $g/cm^3$ to about 1.2 $g/cm^3$, or about 0.60 $g/cm^3$ to about 1.2 $g/cm^3$, or about 0.65 $g/cm^3$ to about 1.2 $g/cm^3$, or about 0.70 $g/cm^3$ to about 1.2 $g/cm^3$, or about 0.75 $g/cm^3$ to about 1.2 $g/cm^3$. In some examples, the density of the synthetic polymeric film of the second layer of the composite structure is within the range of about 0.50 $g/cm^3$ to about 1.0 $g/cm^3$, or about 0.50 $g/cm^3$ to about 0.90 $g/cm^3$, or about 0.50 $g/cm^3$ to about 0.85 $g/cm^3$, or about 0.50 $g/cm^3$ to about 0.80 $g/cm^3$, or about 0.50 $g/cm^3$ to about 0.75 $g/cm^3$, or about 0.50 $g/cm^3$ to about 0.70 $g/cm^3$.

In an example, the synthetic polymeric film is a polypropylene film having a weight average molecular weight ($M_w$) within a range of about $2.90 \times 10^5$ g/mol to about $3.95 \times 10^5$ g/mol, as measured by gel permeation chromatography (GPC) calibrated with a polystyrene standard. The molecular weight distribution as presented by $M_w/M_n$, where $M_n$ is the number average molecular weight, ranges from about 2.9 to about 4.8 for this example. Moreover in this example, the polypropylene film may be either uni-oriented or biaxially oriented with a density of about 0.85 $g/cm^3$ for amorphous area and of about 0.94 $g/cm^3$ for crystalline area. Also, the polypropylene film may have a melt point that may be within a range of about 140° C. to about 185° C.

The composite structure may further comprise a tie layer directly on the synthetic polymeric film of the second layer. The tie layer is to provide better adhesion between the synthetic polymeric film and a subsequent material layer applied to the film to form a wall covering, including an image receiving layer, as further described below. The tie layer may be a polymeric material with a surface free energy that is higher than the surface free energy of the synthetic polymeric film, for example a surface free energy that is greater than 30 milliNewton per meter (mN/m), as measure at 20° C. In some examples, the polymeric material of the tie layer has a surface free energy that is greater than 35 mN/m, or greater than 38 mN/m, or greater than 40 mN/m.

Examples of polymeric material of the tie layer include, but are not limited to, various polyacrylates, various polymethyacrylates, polyethyleneoxide, polyvinyl alcohol, polyethyleneterephthalate, polyamide, polycarbonate, polystyrene, polychlororopene, polyoxyethylene, polystyrene, poly(2-vinyl pyridine), epoxy resins, a combination of two or more of these materials, or a mixture of two or more of these materials. An amount of the tie layer material on the synthetic polymeric film of the second layer may be within a range of about 0.01 grams per square meter (gsm) to about 5 gsm. In some examples, the amount of the tie layer material on the synthetic polymeric film is within the range of about 0.1 gsm to about 5 gsm, or about 0.2 gsm to about 5 gsm, or about 0.35 gsm to about 5 gsm, or about 0.5 gsm to about 5 gsm. In some examples, the amount of the tie layer material on the synthetic polymeric film is within the range of about 0.01 gsm to about 4.5 gsm, or about 0.01 gsm to about 4 gsm, or about 0.01 gsm to about 3.5 gsm, or about 0.01 gsm to about 3 gsm, or about 0.01 gsm to about 2.5 gsm, or about 0.01 gsm to about 2 gsm, or about 0.5 gsm to about 2.0 gsm.

In some examples, the composite structure further comprises an adhesive laminated between the first layer and the second layer. The adhesive may be an aqueous latex adhesive that is selected from a wide variety of resin latex. The resin latex of the adhesive may include, but is not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic acid containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethylene glycol dimethacrylate, bis(acryloylamido)methylene), and combinations thereof. Polymers made from one or both of the polymerization and copolymerization of alkyl acrylate, alkyl methacrylate, vinyl esters, and styrene derivatives also may be used. Representative examples of commercially available adhesive products include, but are not limited to, Acronal® 788 or Acronal® 866 from BASF North America; RayCryl® 347 from Specialty Polymers, Inc., OR, USA; and Flexbond® 325 or Flexbond® 825 from Air Products, Inc., PA, USA.

Figure 1A:
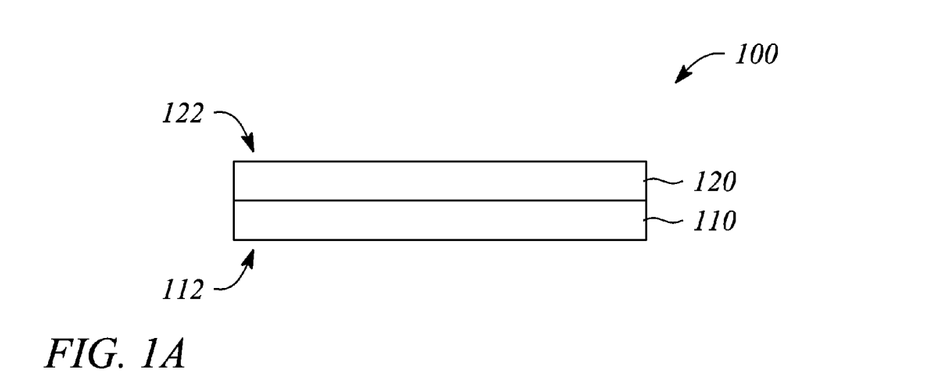
FIG. 1A illustrates a side view of a composite structure for wall covering print media according to an example in accordance with the principles described herein.

FIG. 1A illustrates a side view of an example of a composite structure in accordance with an example of the principles described herein. The composite structure (100) includes a first layer (110), and a second layer (120) laminated to the first layer (110). A non-image side (112) of the composite structure (100) is a back side of the first layer (110). An image side (122) of the composite structure (100) is a front side of the second layer (120).

Figure 1B:
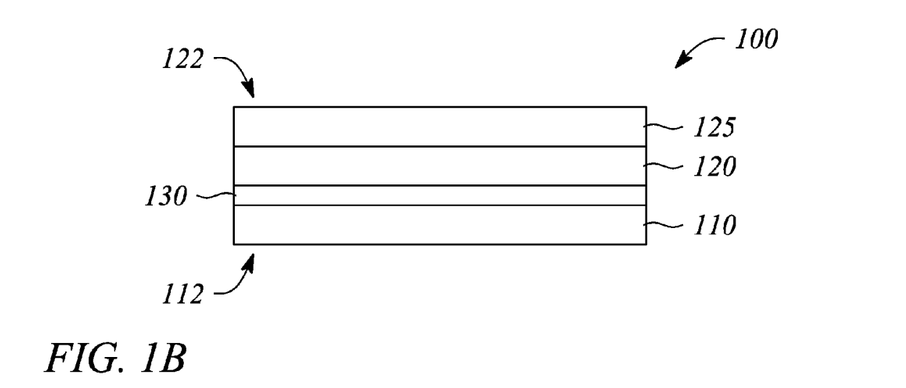
FIG. 1B illustrates a side view of another composite structure for wall covering print media according to an example in accordance with the principles described herein.

FIG. 1B illustrates a side view of another example of the composite structure in accordance with an example of the principles described herein. The composite structure (100) includes a first layer (110), a second layer (120) laminated to the first layer (110), wherein the second layer (120) includes a synthetic polymeric film, and a tie layer (125) directly on the second layer (120). In some examples, the composite structure further includes an adhesive (130) laminated between the first layer (110) and the second layer (120). In FIG. 1B, the image side (122) of the composite structure (100) is associated with the tie layer (125) on the front side of the second layer (120).

In some examples of the principles described herein, a wall covering is provided. The wall covering comprises any of the examples described above of the composite structure and further comprises an image receiving layer coated on the image side of the composite structure and an anti-mechanical wear layer coated on the image receiving layer. The wall covering according to the principles described herein has a durability that may meet or exceed Type-II wall covering standards or specifications identified herein. For example, the wall covering has a mechanical breaking strength that is within a range of at least 50 lb to about 60 lb, or about 55 lb to about 60 lb. In some examples, the mechanical breaking strength in the MD is between about 58 lb and about 60 lb and in the CMD is between about 55 lb to about 58 lb. Moreover, the wall covering has a minimum scrubbability resistance of 300 cycles, or may be more, of linear abrasion. Herein, the minimum scrubbability resistance and the mechanical breaking strength may be referred to as 'wear and tear' for simplicity of discussion.

The image receiving layer comprises a pigment filler, an aqueous-based polymeric binder, and a latex film-forming agent. The image receiving layer may further comprise an additive including, but not limited to, one or both of a processing agent and a property modifier. The pigment filler is selected from one or both of organic filler and inorganic filler in a solids powder form or in a dispersed slurry, for example. Examples of inorganic pigment filler include, but are not limited to, aluminum silicate, clay, kaolin clay, a calcium carbonate, silica, alumina, boehmite, mica, talc, a combination of two or more thereof, or a mixture of two or more thereof. The calcium carbonate may be one or more of ground calcium carbonate (GCC), precipitated calcium carbonate (PCC), modified GCC, and modified PCC. Examples of organic pigment filler include, but are not limited to, particles, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers, or a mixture of two or more of the polymers.

The aqueous-based polymeric binder of the image receiving layer includes, but is not limited to, polyvinyl alcohol, styrene-butadiene emulsion, acrylonitrile-butadiene latex, a combination of two or more of the binders, a combination of one or more of the binders with other aqueous binders, a mixture of two or more of the binders, or a mixture of one or more of the binders with other aqueous binders. Other aqueous binders that may be included in the aqueous-based polymeric binder include, but are not limited to, starch, for example, one or more of oxidized starch, cationized starch, esterified starch, enzymatically denatured starch; gelatin; casein; soybean protein; cellulose derivatives, for example, one or both of carboxy-methyl cellulose and hydroxyethyl cellulose; acrylic emulsion; vinyl acetate emulsion; polyester emulsion; and polyvinylpyrrolidone.

The image receiving layer may include the polymeric binder in an amount that ranges from about 5 parts to about 40 parts per 100 parts of the pigment filler by dry weight. In some examples, the amount of polymeric binder ranges from about 7 parts to about 40 parts per 100 parts of the pigment filler by dry weight, or about 10 parts to about 40 parts per 100 parts of the pigment filler by dry weight, or about 15 parts to about 40 parts per 100 parts of the pigment filler by dry weight. In some examples, the amount of polymeric binder in the image receiving layer ranges from about 5 parts to about 35 parts per 100 parts of the pigment filler by dry weight, or about 5 parts to about 30 parts per 100 parts of the pigment filler by dry weight, or about 5 parts to about 25 parts per 100 parts of the pigment filler by dry weight.

The latex film-forming agent of the image receiving layer is provided to facilitate forming a film of a latex ink (i.e., an image) that may be subsequently deposited on the wall covering as an image. The latex film-forming agent may be any kind of chemical agent having water compatibility and temperature volatility that is capable of lowering an elastic modulus of ink latex particulates and of providing temporary plasticization to promote polymer chain motion to enhance forming a latex ink film from the latex ink particulates. Representative examples of latex film-forming agents include, but are not limited to, citrate or sebacate compounds, ethyoxy alcohols, glycol oligomers and other low molecular weight polymers, glycol ether, glycerol acetals, surfactants that are either anionic, cationic or non-ionic and have a backbone of more than 12 carbons, cyclic amide-like lactams, e.g., β-lactam, γ-lactam, and δ-lactam, a combination of two or more thereof, or a mixture of two or more thereof. In some examples, the latex ink film-forming agent is a cyclic amide-like lactam such as β-lactam, γ-lactam, δ-lactam, or a mixture thereof. In an example, the latex ink film-forming agent is a γ-lactam. Representative examples of a γ-lactam include, but are not limited to, N-methyl-2-pyrrolidone, 5-methyl-2-pyrrolidone, and 2-pyrrolidone.

A ratio of an amount of the pigment filler to an amount of the film forming agent may be within a range of about 200:1 to about 10:1. In some examples, the ratio of the amounts of the pigment filler to the film forming agent is within the range of about 150:1 to about 10:1, or about 100:1 to about 10:1, or about 80:1 to about 10:1, or about 65:1 to about 10:1, or about 50:1 to about 10:1, or about 35:1 to about 10:1. In some examples, the ratio of the amounts of the pigment filler to the film forming agent is within the range of about 200:1 to about 15:1, or about 200:1 to about 20:1, or about 200:1 to about 25:1, or about 200:1 to about 30:1, or about 200:1 to about 35:1, or about 200:1 to about 40:1. In some examples, the ratio of the amounts of the pigment filler to the film forming agent is within the range of about 100:1 to about 11:1, or about 50:1 to about 12:1, or about 35:1 to about 13:1, or about 30:1 to about 14:1.

The anti-mechanical wear layer coated on the image receiving layer of the wall covering according to the principles described herein is a protective layer having a first structure before image formation on the wall covering (e.g., using inkjet printing). The first structure is porous and configured to receive ink colorant and to allow other ink components to penetrate through the anti-mechanical wear layer to the image receiving layer of the wall covering. The first structure of the anti-mechanical wear layer transforms into a second structure to further protect an image after image formation. The transformation occurs after the ink colorant is deposited onto an outermost surface of the anti-mechanical wear layer and after the other ink components have penetrated into the image receiving layer to form the image using inkjet printing. The second structure of the anti-mechanical wear layer is non-porous and transparent and provides a thin protective film on the outermost surface of the wall covering.

The anti-mechanical wear layer having the first structure and the second structure according to the principles described herein may comprise three types of polymeric particles. A first type of polymeric particles has a substantially non-deformable stage and a substantially deformable stage. By 'non-deformable stage', it is meant that the particles are non-deformable prior to printing an ink image on the image receiving layer, but can deform or form a film (i.e., 'deformable stage') under printing temperature conditions of a printing process, e.g., latex ink inkjet printing, that forms an image on the wall covering. Thus, by 'non-deformable' it is also meant that the particles are rigid and can form a porous array or coating to protect the wall covering prior to printing an image thereon, but the particles are also able to coalesce and flow to form a localized film, due at least in part to a rise in temperature during a cure step of printing an image to protect an image subsequently printed thereon. In particular, the temperature of the printing or curing process is to be above a glass transition temperature (Tg) of the first type of particles of the anti-mechanical wear layer in order to coalesce and flow.

The first type of polymeric particles (hereinafter 'first particles') of the anti-mechanical wear layer may have a Tg that is within a range of about 50° C. to about 200° C. In some examples, the Tg of the first particles is within the range of about 50° C. to about 190° C., or about 50° C. to about 175° C., or about 50° C. to about 150° C., or about 50° C. to about 135° C., or about 50° C. to about 125° C. In some examples, the Tg of the first particles is within the range of about 60° C. to about 200° C., or about 70° C. to about 200° C., or about 80° C. to about 200° C., or about 90° C. to about 200° C., or about 100° C. to about 200° C., or about 85° C. to about 175° C., or about 80° C. to about 150° C. The first particles are rigid and packed together in a porous arrangement or layer (in microscopic scale) in the anti-mechanical wear layer before printing and under ambient storage conditions, but are configured to deform and coalesce into a localized, nonporous or continuous film under conditions of printing an image with an ink, e.g., latex ink.

The first particles are selected from reactive polymeric particles and non-reactive polymeric particles. By 'reactive polymeric particles' it is meant particles that are configured to, or capable of, cross-linking (either via self-cross-linking, e.g., within a single molecule chain, or among multiple molecule chains, such as in the presence of a cross-linking agent) upon exposure to heat, for example, during printing. Under such conditions, the reactive polymeric particles may also coalesce so that the reactive polymer particles flow together to form a film at least due to in part chemical bonding during the cross-linking reaction. The cross-linking of the reactive polymer particles can form a continuous, non-porous protective film that is both heat flowed and cross-linked.

For example, the first particles may be configured to be reactive by incorporating a cross-linkable functional group to the particles. In this example, the cross-linkable functional group is configured to be activated by heat that initializes a cross-linking reaction with a rise in temperature, e.g., during printing or curing processes. As a result, upon printing an image with an ink on a wall covering including the anti-mechanical wear layer that includes these first particles, the collapse of these particles and the cross-linking of the cross-linkable functional groups cause these particles to coalesce and embed printed ink pigment so that these particles physically interlock with the printed or otherwise deposited ink and protect the image.

Reactive polymeric particles included as the first particles herein have macromolecular chains capable of a cross-linking reaction and coalescing, as described above. Examples of such reactive polymer particles include, but are not limited to, particles of a polymer having an epoxy functionality on a backbone of the polymer, particles of a polymer having an epoxy functionality on a side chain of the polymer, particles of a polymer having fatty acid groups, particles of a polymer having alkoxy-silane groups, particles of a polymer having acetoacetoxy groups, particles of a polymer having hydroxyl groups, particles of a polymer having amine groups, and particles of a polymer having carboxyl groups.

By 'non-reactive particles' it is meant that the particles do not initialize a cross-linking reaction, but instead the particles are configured to coalesce and flow together to form a film due to a rise in temperature above the Tg of the particles, e.g., by exposure to heat during a printing process. As such, the anti-mechanical wear layer including non-reactive first particles on a wall covering according to the principles described herein forms a continuous, non-porous protective film that remains uncrosslinked after an image is printed on the wall covering.

The non-reactive first particles may be selected from polymers formed by one or both of polymerization and copolymerization of hydrophobic addition monomers. Examples of hydrophobic addition monomers include, but are not limited to, C1-C12 alkyl acrylate and methacrylate monomers (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylic acid containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate), vinyl benzene monomers, C1-C12 alkyl acrylamide and methacrylamide monomers (e.g., t-butyl acrylamide, sec-butyl acrylamide, N,N-dimethylacrylamide), and olefin monomers (e.g., polyethylene, polypropylene, and co-polymers thereof). The non-reactive, non-deformable particles also may be selected from polytetrafluoroethylene (PTFE), silica, silicone, paraffin wax, carnauba wax, montan wax, a combination of two or more of the monomers or materials, or a mixture of two or more of the monomers or materials.

The anti-mechanical wear layer further comprises a second type of polymeric particles. The second type of polymeric particles (hereinafter 'second particles') is made from a substantially soft polymeric material. By definition herein, 'soft' polymeric material refers a polymeric material that has a Tg that is no greater than the Tg of the polymeric material of the first particles. In some examples, the Tg of the second particles is at least 2 to about 2.5 orders of magnitude less than the Tg of the first particles. The second particles are configured to provide some adhesive force to the first particles and a third type of polymeric particles (described below), and to hold the first particles and the third particles on to a surface of image receiving layer. For example, the second particles provide an adhesive coating onto one or both of the first particles and the third particles. In this example, the second particles may chemically bond with surfaces of one or more of the first particles, the third particles, and the image receiving layer surface, or may bond by physical force or an interlocking action through film forming among the surfaces of the particles and the image receiving layer, or by a combination of bonding mechanisms.

In some examples, the second particles have a morphology that includes one or both of spherical and spheric-like, wherein the second particles may be dispersed in an aqueous solution, for example as a polymeric latex. The second particles may have a particles size range from sub-micrometer to no greater than about 10 μm in diameter. By 'sub-micrometer', it is meant less than about 1 μm. Examples of latex polymeric material used to make these latex second particles include, but are not limited to, acrylic polymers or copolymers latex, vinyl acetate latex, polyesters latex, styrene-butadiene latex, acrylonitrile-butadiene copolymers latex, styrene acrylic copolymers latex, styrene acrylic latex, styrene acrylonitrile latex, styrene maleic anhydride latex, vinyl acrylic latex, vinyl acetate latex, vinyl ester latex, vinyl ether latex, a combination of two or more of the latexes, or a mixture of two or more of the latexes.

In some examples, the second particles are present in a solvent, for example in an aqueous solvent, as a molecular colloid or a colloidal suspension. In these colloidal examples, the second particles have a diameter in nanometer scale, or a sub-nanometer scale. By 'nanometer scale' it is meant 1 nanometer (nm) to less than 1 μm. By 'sub-nanometer scale', it is meant less than 1 nm. Examples of the polymeric materials used to make these colloidal second particles include, but are not limited to, polyvinyl alcohol, starch and starch derivatives, gelatin and gelatin derivatives, cellulose and cellulose derivatives, acrylamide polymers, polyethylene glycol, polyethylene glycol derivatives, polyurethane, polyvinylpyrrolidone, maleic anhydride polymer, maleic anhydride copolymers, a combination of two or more of the materials, or mixtures of two or more of the materials. In a further example, the second particles include a combination of the above-described latex polymeric particles and the above-described smaller colloidal polymeric particles or a mixture thereof.

The anti-mechanical wear layer further comprises a third type of polymeric particles. The third type of polymeric particles (hereinafter 'third particles') is made from a polyalkene homopolymer, a polyalkene copolymer, a modified polyalkene, a combination of two or more of the polyalkenes, or a mixture of two or more thereof, for example. By definition, a 'polyalkene' herein refers to a polymeric material formed via polymerization of an alkene monomer, i.e., $C_nH_{2n}$ and its derivatives, for example, where n is within a range of about 7,000 to about 20,000. Examples of the polymers used to make the third particles include, but are not limited to, polyethylene homopolymer, polypropylene homopolymer, polytetrafluoroethylene (PTFE), amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride functioned polyethylene, chloride functioned polypropylene, a combination of two or more of the polyalkenes, or a mixture of two or more of the polyalkenes.

The third particles may have a hardness value less than about 2 dmm, as measured by ASTM D-5 method. In some examples, the third particles have a hardness value less than about 1 dmm, or less than about 0.5 dmm. In some examples, the third particles have a hardness value in dmm within a range of about 0.1 to about 2, or about 0.1 to about 1.5, or about 0.1 to about 1.0, or about 0.1 to about 0.75, about 0.1 to about 0.5, or about 0.1 to about 0.25. In addition, the third particles may have a melting point within a range of about 120° C. to about 200° C. In some examples, the melting point of the third particles is within the range of about 125° C. to about 200° C., or about 130° C. to about 200° C. In some examples, the melting point of the third particles is within the range of about 120° C. to about 190° C., or about 120° C. to about 180° C., or about 120° C. to about 170° C., or about 120° C. to about 160° C., or about 130° C. to about 170° C. Moreover, the third particles may have a particle size that is at least about ten times bigger than the first particles. In some examples, the third particles have a particle size that is at least about 25 times bigger than the first particles, or at least about 50 times bigger than the first particles, or at least about 75 times bigger than the first particles, or at least about 100 times bigger than the first particles, or about 125 times bigger than the first particles.

Representative commercially available examples of the third particles include, but are not limited to, ACumist® micronized polyolefin waxes by Honeywell, N.J., USA, SLIP-AYD® waxes by Elementis Specialties, Inc. NJ, USA, and Licowax® waxes by Clariant, Germany. In another example, the third particles are made from a micronized polyalkene compound dispersed in an aqueous solvent. A ratio by dry weight of the first particles to the second particles to the third particles in the anti-mechanical wear layer may be within a range of about 20:1:2 to about 10:1:0.4. In some examples, the ratio by dry weight of the first particles to the second particles to the third particles in the anti-mechanical wear layer is within the range of about 20:1:2 to about 16:1:1.6, or about 20:1:2 to about 14:1:1.2, or about 20:1:2 to about 12:1:0.8.

Figure 2:
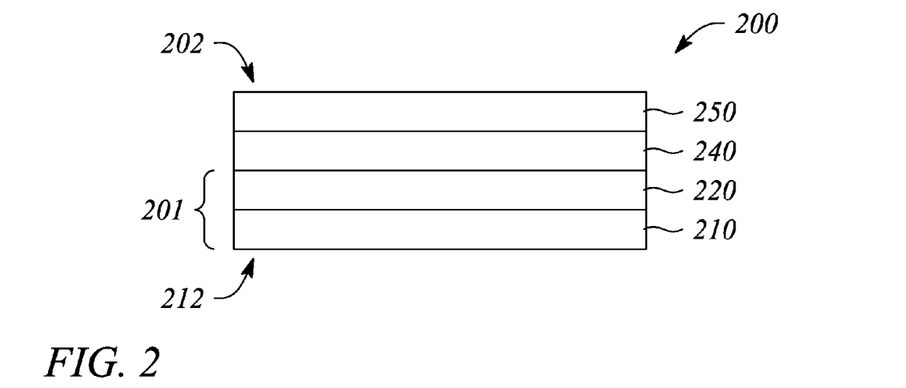
FIG. 2 illustrates a side view of a wall covering according to an example in accordance with the principles described herein.

FIG. 2 illustrates a side view of a wall covering in accordance with an example of the principles described herein. The wall covering includes a composite structure (201) that includes a first layer (210) laminated to a second layer (220). In some examples, the composite structure (201) is substantially equivalent to any of the examples described above for the composite structure. The wall covering further includes an image receiving layer (240) coated on an image side of the composite structure (201), wherein the image side is opposite to a non-image side (212) (or back side) of the composite structure (201). The wall covering further includes an anti-mechanical wear layer (250) coated on the image receiving layer (240) to provide an imaging surface (202) for the wall covering (200).

A coat weight of the image receiving layer of the wall covering may be within a range of about 5 gsm to about 30 gsm. In some examples, the coat weight of the image receiving layer is within the range of about 5 gsm to about 25 gsm, or about 5 gsm to about 20 gsm, or about 5 gsm to about 15 gsm, or about 5 gsm to about 10 gsm. In some examples, the coat weight of the image receiving layer is within the range of about 6 gsm to about 25 gsm, or about 7 gsm to about 20 gsm, or about 8 gsm to about 15 gsm. A coat weight of the anti-mechanical wear layer of the wall covering may be within a range of about 0.5 gsm to about 10 gsm. In some examples, the coat weight of the anti-mechanical wear layer is within the range of about 0.5 gsm to about 8 gsm, or about 0.5 gsm to about 6 gsm. In some examples, the coat weight of the anti-mechanical wear layer is within the range of about 0.7 gsm to about 10 gsm, or about 0.8 gsm to about 8 gsm, or about 1 gsm to about 5 gsm.

Figure 3:
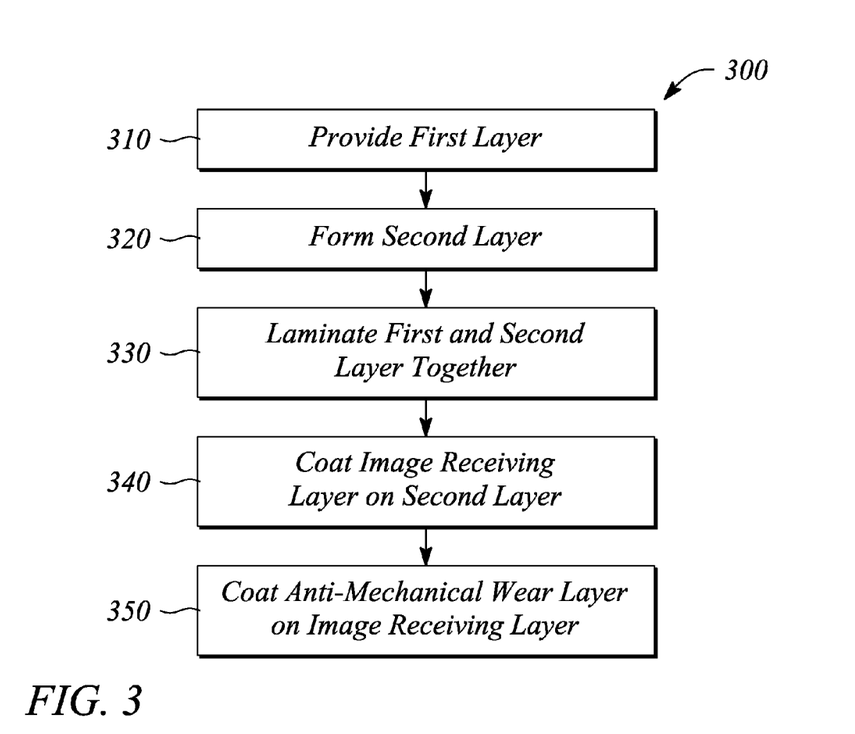
FIG. 3 illustrates a flow chart of a method of making a wall covering according to an example in accordance with the principles described herein.

In some examples according to the principles described herein, a method of making a wall covering is provided. FIG. 3 illustrates a flow chart of a method (300) of making a wall covering according to an example of the principles described herein. The wall covering that is made is substantially equivalent to any of the examples of the wall covering, including the composite structure, described above. The method (300) comprises providing (310) a first layer fabric. The first layer fabric includes any of the above-described fabric materials and structures, including woven, non-woven, knitted or tufted fabric structures. The first layer fabric is provided (310) using a textile manufacturing technique, for example.

The method (300) of making a wall covering further comprises forming (320) a second layer that includes a synthetic polymeric component. The second layer includes any of the above-described examples for the second layer. For example, the second layer may be a non-woven paper composition that is formed (320) using paper making techniques and paper making equipment. In this example, the second layer is formed (320) using a paper making process (the wet forming process), where fibers are suspended in water, brought to a forming unit where the water is drained off through a continuous moving wire or screen and the fibers are deposited on the wire, and then the fibers are picked off the wire to be dried. In order to have a targeted formed web or sheet, the fiber concentration for the non-woven paper composition may be very low, such as less than about 0.5% by weight.

Synthetic polymeric fiber used in forming (320) the second layer may not be capable of being self-bonded together, for example with hydrogen bonding as natural wood fiber is. Therefore, an external bonding method is employed with the synthetic polymeric fiber, such as with one or more of a variety of binder types and application methods. For example, a binder may be applied either before web formation or after web formation. After web formation, the binder may be applied by saturation, spraying, printing, foaming, or a combination thereof. After application of the binder, the web may be dried and in some examples, the binder may be activated, with steam heated cans, for example. At the end of the processing line, the web is calendered to densify, smooth, and soften the non-woven paper to achieve a target density and smoothness of the second layer. For example, the target smoothness of no greater than 5 microns by PPS method is achieved with various combinations of calender pressure within a range of about 35 kilograms per square centimeter ($kg/cm^2$) to about 140 $kg/cm^2$ and calender temperature within a range of about 25° C. to about 300° C.

Figure 4:
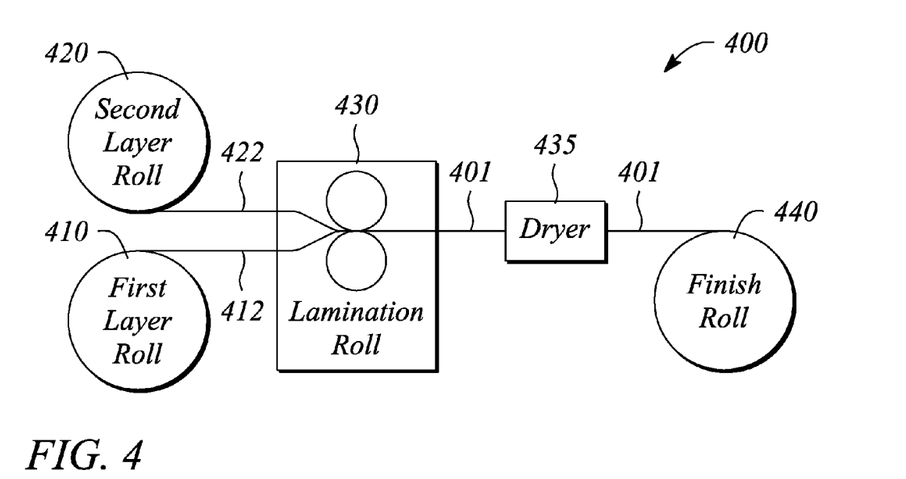
FIG. 4 illustrates a schematic view of a laminator used to laminate together layers of a composite structure according to an example of the principles described herein.

The method (300) of making a wall covering further comprises laminating (330) the first layer and the second layer together to form a composite structure. The first and second layers are laminated (330) together using a laminator. FIG. 4 illustrates a schematic view of a laminator (400) used to laminate together the layers of the composite structure according to an example of the principles described herein.

As illustrated in FIG. 4, the provided first layer (412) is wound into a first roll (410) and the formed second layer (422) is wound into a second roll (420). The first layer (412) is unwound under tension from the first roll (410) and separately, the second layer (422) is unwound under tension from the second roll (420). The first layer (412) and the second layer (422) are fed together at a lamination roll (430) where they are laminated together to form the composite structure (401), which is dried in a drying oven or dryer (435) and wound onto a finished roll (440). In some examples, the second layer (422) is unwound from the second roll (420) to be coated with an adhesive from an adhesive bath (not illustrated). In some of these examples, the adhesive is coated onto the second layer (422) using a metering rod that is facilitated by a pick-up roll (also not illustrated). In other examples, the second layer (422) is fed to the lamination roll (430) without an adhesive coating. A tension within a range of about 60 Newton (N) to about 120 N may be applied to the second layer (422), and a tension within a range of 80 N to about 160 N may be applied to the first layer (412) using the laminator (400). The first layer (412) and the second layer (422) are laminated together at the lamination roll (430) at a speed that may range from about 10 meters/minute to 30 meters/minute, and then dried in the dryer (435) using a peak temperature that may range from about 50° C. to about 150° C.

The method (300) of making a wall covering further comprises coating (340) an image receiving layer onto an image side of the composite structure. The image side is adjacent to the second layer. The image receiving layer may be coated onto the composite structure using applicator including, but not limited to, one or more a spray coater, a spin coater, a slot die applicator, fountain curtain applicator, blade applicator, rod applicator, air knife applicator, or air brush applicator. The image receiving layer is then dried using one or more a blower, a fan, an infrared lamp, and an oven. The method (300) further comprises coating (350) an anti-mechanical wear layer onto the image receiving layer. The anti-mechanical wear layer may be coated (350) onto the composite structure using any of the coaters or applicators listed above, or another application method. The anti-mechanical wear layer is then dried using one or both of low temperature heating and air flow.

While not illustrated, the method of making a wall covering may further comprise forming an image on the image side of the wall covering. An image may be formed on the wall covering according to the principles described herein using printing techniques, such as one or more of inkjet printing, digital inkjet printing, and high speed inkjet printing. Moreover, the image may be formed using one or more of aqueous-pigment inks, aqueous-UV inks, and aqueous-latex inks Representative examples of printers used to print on the wall covering include, but are not limited to, HP DesignJet printers: L25500, L26500, and L65500; HP Scitex printers: LX600, LX800, LX850, and TurboJet 8600 UV from Hewlett-Packard Company. Representative inkjet inks used by the above-listed printers include, but are not limited to, HP 791, HP 792, and HP Scitex TJ210. The printers may be used in a standard wall paper profile with a production print mode or a normal print mode. The print mode may vary the ink application within a range of from about 50% to about 250% of each other.

In some examples, the non-image side of the wall covering is coated or treated with an adhesive for adhering to a wall or other surface. Examples of wall-adhering adhesives for wall coverings include, but are not limited to, Pro-880 Premium Clear Strippable, Pro-838 Heavy Duty Clear, Pro-543 Universal, ECO-888 Strippable with Mildew Guard, and Golden Harvest Wheat wallpaper adhesives, all from Roman Decorating Products, IL, USA; Zinsser® Sure Grip®-128 and Zinsser Sure Grip®-132 wallpaper adhesives, both from Rust-Oleum® Corporation, USA; Dynamite® 234, Dynamite® C-11, Dynamite® DEFENDER wallpaper adhesives, each by Gardner-Gibson, Fla., USA; Polycell® Paste the Wall wallpaper adhesive from AkzoNobel Group of Companies, UK; ECOFIX adhesive from Ecofix AB, Sweden; and Methylan and Solvite wallpaper adhesives from Henkel, Germany.

Specific examples and evaluations of the composite structure and the wall covering including the same are provided below.

EXAMPLES

All measured values are within measurement tolerance for the equipment used, unless otherwise indicated.

Sample wall coverings in accordance with the principles described herein were prepared for evaluation as Type II durable wall coverings under ASTM F793, "Standard Classification of Wall Covering by Use Characteristic" (version 2010 substantially followed Federal Specification CCC-W-408D), which defines the durability requirements of wall coverings from 'decorative' wall coverings (Category I) to more stringent use cases defined as 'commercial serviceability' wall coverings Type I (Category IV), Type II (Category V), Type III (Category VI) and up to "Type IV". Under ASTM F793, there are approximately 15 individual tests for various usability, resistance and strength criteria that may be performed. In order to claim a specific use classification, the wall covering must pass all 15 test criteria. The higher the classification or use case, the higher is the required resistance standards. Table I provides two of the tests from the classification criteria of ASTM F793 (2010), by way of example, for Type I (Category IV), Type II (Category V) and Type III (Category VI) Commercial Serviceability wall coverings and as a comparison, Category III for Decorative wall covering with high serviceability.

Minimum scrubbability, referenced at Section 7.7 of ASTM F793, and minimum breaking strength, referenced at Section 7.9 of ASTM F793, were performed on wall coverings samples in accordance with the principles described herein that were prepared herein for evaluation. As is evident from Table 1, wall coverings under the Category III have a significantly lower minimum scrubbability standard and no minimum breaking strength standards compared to Categories IV-VI. The minimum scrubbability is reported in number of cycles and the minimum breaking strength is reported in pounds (lb) of force in ASTM F793.

TABLE 1

| ASTM F793 TEST | Category III Decorative with High Serviceability | Category IV Type I Commercial Serviceability | Category V Type II Commercial Serviceability | Category VI Type III Commercial Serviceability |
|---|---|---|---|---|
| Minimum scrubbability (Section 7.7) | 50 cycles | 200 cycles | 300 cycles | 500 cycles |
| Minimum breaking strength (Section 7.9) | — | — | — | — |
| MD (machine direction) | — | 40 lb | 50 lb | 100 lb |
| CMD (Cross MD) | — | 30 lb | 55 lb | 95 lb |

Preparation of Samples

Table 2 lists the composition of the prepared wall coverings samples in accordance with the principles described herein, having a composite support structure, an image receiving layer and an anti-mechanical wear layer, as described above. In particular, the first layer of the composite structure (Layer 1) for both Examples 1 and 2 was a woven fabric with 90% of total fiber count of polyester fibers and 10% of total fiber count of natural cotton fibers, and having a yarn count of 46 by 48 (identified in Table 2 as Fabric A). The Example 1 second layer (Layer 2) of the composite structure was a non-woven fiber composition (identified in Table 2 as Composition A); and in Example 2, the second layer (Layer 2) was a polypropylene film, with a basis weight 170 gsm. Composition A included 12% by weight of polyethylene fiber, 8% by weight calcium carbonate filler, 69% by weight of natural cellulose fibers, and 11% by weight of other additives such as binder, coupling agent, color dye, and optical brightener agent.

An adhesive was applied to Layer 2 using a #60 rod; a tension of 75 Newton (N) was applied to Layer 2 and a tension of 100 N was applied to Layer 1 using a laminator. Layers 1 and 2 were laminated together at a speed of 20 meters/min and dried using a peak temperature of 80° C.

Two different comparison samples were included in the evaluation. Comparison Sample 1 was a commercially available, HP PVC-free wallpaper (Hewlett-Packard Co., USA) based on a non-woven composite material without synthetic fiber having an image receiving layer that was a calcium carbonate-based inorganic pigment coating with a coat weight of 15 gsm (e.g., Decorative class). Comparison Sample 2 was a commercially available digital printable wall covering that included a polyester and natural fiber composition, advertised as being Type-II commercial strength, and PVC-free.

TABLE 2

| Samples | Composite Support Structure | | Image Receiving Layer | Anti-Mechanical Wear Layer |
|---|---|---|---|---|
| | Layer 1 | Layer 2 | | |
| Example 1 | Fabric A | Composition A | Coating A | Coating B |
| Example 2 | Fabric A | Polypropylene Non-woven | Coating A | Coating B |
| Comparative Sample 1 | — | Composite without Synthetic Fiber | Yes | No |
| Comparative Sample 2 | Unknown Structure of Polyester and Natural Fibers | | Unknown | Unknown |

Both Examples 1 and 2 Samples were coated with a pigmented coating, Coating A, as an image receiving layer, having a coat weight of 12 gsm. Moreover, both Examples 1 and 2 Samples were coated with a multi-structured coating, Coating B, as an anti-mechanical wear layer, having coat weight of 5 gsm, on the pigmented coating A. A production coater equipped with Mayer rod application station was used to coat the two coating layers with wet-on-dry sequence. Drying was accomplished in an 8 meter hot air drying channel with a total coating speed of 200 meters per minute.

The composition of the pigmented coating (Coating A) is listed in Table 3. Hydrocarb® 60 and Hydrocarb® 90 are calcium carbonate pigment fillers from Omya North America. Acronal® 866 is a styrene-acrylic binder from BASF Corporation, North America. The film forming agent was a 2-pyrrolidone, supplied by Aldrich Inc. BYK®-Dynwet® 800 is a silicone-free wetting agent and BYK®-024 is a VOC-free silicone defoamer, both from BYK USA, Inc., CT. The pigmented coating A was prepared in a high shear mixer. The final solids content after mixing was 52% and the viscosity was 180 centipoise (cps) as measured by a Brookfield viscometer at 100 rpm.

TABLE 3

PIGMENTED COATING A

| Ingredient | Amount (Parts) |
|---|---|
| Hydrocarb® 60 | 80 |
| Hydrocarb® 90 | 20 |
| Acronal® 866 | 15 |
| Film forming agent | 1 |
| BYK®-Dynwet® 800 | 0.5 |
| BYK®-024 | 0.2 |

The composition of the multi-structured coating (Coating B) is listed in Table 4. RayCat® 061 is polyacrylic polymer particles (i.e., the first type of particles) and RayCat® 100 is acrylate-based polymeric particles in a latex form (i.e., the second type of particles), both from Specialty Polymers, Inc., OR, USA. SLIP-AYD® SL300 is a high melt polyethylene wax dispersion (i.e., the third type of particles) from Elementis Specialties.

The multi-structured coating B was prepared by mixing the ingredients at room temperature in a mixing tank with mediate shear speed (50-100 rpm) for 30 minutes. The mixture was filtered with a 200 mesh screen and left for 1 hour to degas before use.

TABLE 4

MULTI-STRUCTURED COATING B

| Ingredient | Amount (Parts) |
|---|---|
| RayCat® 061 | 50 |
| SLIP-AYD® SL300 | 12 |
| RayCat® 100 | 5 |
| BYK®-Dynwet® 800 | 0.5 |

Printing Image on Samples:

The Examples 1 and 2 Samples and Comparison Samples 1 and 2 were printed using an HP DesignJet L26500 printer equipped with HP 792 latex inks, using a six color process at 110° C. and at a speed of 100 square feet per hour (a 10 pass bidirectional color profile). An image was created on each Sample with an equal percentage of each of the six ink colors. A final visual appearance of the image was a grey-looking area on the Samples. Per ASTM F793, the image included many different colors.

Minimum Scrubbability Test

Preparation of Wall Covering Scrubbability Samples:

Per ASTM F793 section 7.7, one piece each of Examples 1 and 2 Samples and Comparison Samples 1 and 2 were cut into 6.5 inches×17 inches specimens, such that a longer dimension was in the cross-machine direction. As specified in the ASTM F793, an area with many different printed colors was chosen on each Sample.

The minimum scrubbability test (solvent resistance), in accordance with ASTM F793, was performed by exposing the various Samples to a nylon bristle brush and detergent solution made in accordance with "Note 1" under section 7.4.1 of ASTM F793, in a BYK Abrasion Tester from BYK-Gardner USA, Columbus, Md. with a linear, back-and-forth action, attempting to wear down the image side of the Samples using the target number of cycles in Table 1. After the test was concluded, the Samples were subjectively rated 'pass' or 'fail' according to the guidelines listed in 7.7.2 and the visual rating criteria listed in 7.4.2 of ASTM F793, "there shall be no evidence of appreciable change to the printed or ground surface." Table 5 lists the results of the minimum scrubbability test for the Samples.

TABLE 5

| Scrubbability Samples | Cycles completed until wear was visible |
|---|---|
| Example 1 Sample | 300 |
| Example 2 Sample | 300 |
| Comparison Sample 1 | less than 100 |
| Comparison Sample 2 | less than 100 |

Minimum Breaking Strength Test

Preparation of Wall Covering Breaking Strength Samples:

Per ASTM F793 section 7.9, samples were cut in the machine direction (MD) and samples were cut in the cross machine direction (CMD) of Examples 1 and 2 Samples and Comparison Samples 1 and 2, either printed or unprinted, into 4 inches×6 inches specimens. All the specimens cut and tested in the MD were averaged and then compared to an average for all of the specimens cut and tested in the CMD. There were two specimen replicates for each Sample.

The minimum breaking strength test (tensile strength), according to ASTM F793, was performed in HP's Analytical Services Lab by exposing the Samples to a standard force-gauge tester, Instron Model No. 5566, Tensile & Tear Instrument, from Instron, USA. Two clamps were used to grasp longer ends of rectangular shaped specimens of the respective Samples and then to pull with increasing force until failure occurred (i.e., separation of the material). Table 6 lists the results of the minimum breaking strength test for the Samples (average tensile breaking strength in pounds (lb)). The average breaking strength of the Example 1 and 2 Samples was about two times greater in the machine direction and about four times greater the cross-machine direction than the respective average for the Comparison Samples 1 and 2.

TABLE 6

| | Average Breaking Strength (lb) | |
|---|---|---|
| Breaking Strength Samples: | Machine Direction (MD) | Cross-Machine Direction (CMD) |
| Example 1 Sample | 60 | 58 |
| Example 2 Sample | 58 | 55 |
| Comparison Sample 1 | 21 | 14.7 |
| Comparison Sample 2 | 20 | 14 |

For both the minimum scrubbability test and the minimum breaking strength test, Examples 1 and 2 Samples, in accordance with the principles described herein, met or exceeded the Table 1 values in the ASTM F793 for Type-II commercially serviceable wall coverings, and did so without a PVC component.

Thus, there have been described examples of a composite structure, a wall covering employing the composite structure, and a method of making the wall covering that includes the composite structure. It should be understood that the above-described examples are merely illustrative of some of the many specific examples that represent the principles of what is claimed. Clearly, those skilled in the art can readily devise numerous other arrangements without departing from the scope defined by the following claims.

What is claimed is:

1. A wall covering comprising:
a composite structure having an image side and a non-image side, the composite structure comprising:
a first layer having a fabric structure with warp and weft to facilitate airflow on the non-image side; and
a second layer laminated to the first layer, the second layer comprising one of synthetic polymeric fiber in a non-woven structure and a synthetic polymeric film, the second layer having a surface roughness of less than about 5 microns by PPS method on the image side;
an image receiving layer coated on the second layer to support an ink image; and
an anti-mechanical wear layer coated on the image receiving layer, the wall covering being PVC-free and having a durability of Type-II wall coverings.

2. The wall covering of claim 1, wherein the first layer of the composite structure is a fabric that comprises one or both of natural fibers and synthetic fibers having the fabric structure that is one of woven, non-woven, knitted and tufted, the fabric structure to provide airflow channels on the non-image side.

3. The wall covering of claim 1, wherein the first layer of the composite structure is a fabric that comprises both natural fibers and synthetic fibers in a woven structure, an amount of natural fibers being about 10% of a total fiber count and an amount of synthetic fibers being about 90% of the total fiber count.

4. The wall covering of claim 1, wherein the second layer of the composite structure is a fiber composition that comprises the synthetic polymeric fiber and further comprises natural cellulose fiber in the non-woven structure, an amount of the synthetic polymeric fiber in the fiber composition is within a range of about 10% to about 80% by weight of total fibers.

5. The wall covering of claim 1, wherein the second layer of the composite structure is the synthetic polymeric film, the synthetic polymeric film being one or both of homopolymers and copolymers selected from the group consisting of polyethylene, polypropylene, polyamides, polystyrene, acrylonitrile butadiene styrene, polycarbonate, a combination of two or more thereof, and a mixture of two or more thereof.

6. The wall covering of claim 1, wherein a mechanical breaking strength of the wall covering is greater than or equal to 55 lb in both a machine direction and a cross-machine direction, and wherein a mechanical scrubbability resistance is to 300 cycles of linear surface abrasion.

7. The wall covering of claim 1, wherein the image receiving layer comprises pigment filler, an aqueous-based polymeric binder in an amount that ranges from about 5 parts to about 40 parts per 100 parts of the pigment filler by dry weight, and a latex film-forming agent in a ratio of the pigment filler to the latex film-forming agent that is within a range of about 200:1 to about 10:1.

8. The wall covering of claim 1, wherein the anti-mechanical wear layer has a porous first structure without an image printed on the wall covering and has a non-porous second structure with an image printed on the wall covering, the porous first structure to transform into a transparent, non-porous film second structure with printing of the image.

9. The wall covering of claim 1, wherein the anti-mechanical wear layer comprises first polymeric particles that are rigid but deformable and have a glass transition temperature (Tg) within a range of about 50° C. to about 200° C.; second polymeric particles that are soft and have a Tg that is no greater than the Tg of the first polymeric particles; and third polymeric particles of a polyalkene material with a melting point within a range of about 120° C. to about 200° C., a ratio by dry weight of the first polymeric particles to the second polymeric particles to the third polymeric particles is within a range of about 20:1:2 to about 10:1:0.4.

10. The wall covering of claim 9, wherein the first polymeric particles are coalesceable and film-forming particles selected from a reactive polymeric material and a non-reactive polymeric material, the second particles being a polymeric binder, and wherein the third polymeric particles have a formula $C_nH_{2n}$ where n is within a range of about 7,000 to about 20,000.

11. A composite structure to support a wall covering comprising:
- a first layer fabric forming a non-image side of the composite structure, the first layer fabric comprising one or both of natural fibers and synthetic fibers in a fabric structure that is one of woven, non-woven, knitted and tufted to facilitate air flow on the non-image side; and
- a second layer laminated to the first layer to form an image side of the composite structure, the second layer comprising a synthetic polymeric component in one of a non-woven fiber structure and a film and having a surface roughness of less than or equal to 5 microns by PPS method,
- wherein the composite structure is PVC-free and has a mechanical breaking strength greater than 50 lb of Type-II wall covering standards.

12. The composite structure of claim 11, wherein the second layer further comprises a natural component of cellulose fibers and a polymeric binder in the non-woven fiber structure, the synthetic polymeric component being polymeric fibers selected from the group consisting of polyolefins, polyamides, polyesters, polyurethanes, polycarbonates, polyacrylics, a combination of two or more of the polymeric fibers, and a mixture of two or more thereof, a ratio of the polymeric binder to the cellulose fibers being within a range of about 1:20 to about 1:1.

13. The composite structure of claim 11, wherein the second layer is a synthetic polymeric film having a thickness within a range of about 40 microns to about 300 microns and a density within a range of about 0.50 gram per cubic centimeter ($g/cm^3$) to about 1.2 $g/cm^3$, the synthetic polymeric film being one or both of homopolymers and copolymers of high molecular weight selected from the group consisting of polyethylene, polypropylene, polyamide, polystyrene, acrylonitrile butadiene styrene, polycarbonate, a combination of two or more thereof, and a mixture of two or more thereof.

14. A PVC-free Type-II wall covering comprising:
- a composite structure comprising:
  - a first layer fabric comprising natural fibers and synthetic fibers in a woven structure with warp and weft to facilitate airflow on a non-image side; and
  - a second layer laminated to the first layer fabric and having a surface roughness of less than about 5 microns by PPS method on an image side, the second layer comprising one of a non-woven fiber structure that comprises synthetic polymeric fiber within a range of about 10% to about 40% by weight of total fiber and a synthetic polymeric film having a thickness within a range of about 40 microns to about 300 microns;
- an image receiving layer coated on the image side of the second layer to support an ink image; and
- an anti-mechanical wear layer coated on the image receiving layer having a transformable porous structure.

15. The PVC-free Type-II wall covering of claim 14, further comprising the ink image on the image side, wherein the transformable porous first structure is transformed to a non-porous, transparent film structure to protect the ink image.

* * * * *